(12) United States Patent
Kim et al.

(10) Patent No.: US 11,876,227 B2
(45) Date of Patent: Jan. 16, 2024

(54) LITHIUM SECONDARY BATTERY

(71) Applicant: LG CHEM, LTD., Seoul (KR)

(72) Inventors: Minsu Kim, Daejeon (KR); Kwonnam Sohn, Daejeon (KR); Dongwook Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 519 days.

(21) Appl. No.: 17/283,395

(22) PCT Filed: Nov. 6, 2019

(86) PCT No.: PCT/KR2019/014941
§ 371 (c)(1),
(2) Date: Apr. 7, 2021

(87) PCT Pub. No.: WO2020/096331
PCT Pub. Date: May 14, 2020

(65) Prior Publication Data
US 2021/0384508 A1 Dec. 9, 2021

(30) Foreign Application Priority Data

Nov. 7, 2018 (KR) .................. 10-2018-0135536
Nov. 7, 2018 (KR) .................. 10-2018-0135538
Nov. 4, 2019 (KR) .................. 10-2019-0139543

(51) Int. Cl.
*H01M 4/58* (2010.01)
*H01M 4/583* (2010.01)
(Continued)

(52) U.S. Cl.
CPC ......... *H01M 4/5815* (2013.01); *H01M 4/583* (2013.01); *H01M 10/0525* (2013.01);
(Continued)

(58) Field of Classification Search
CPC .............. H01M 4/5815; H01M 4/583; H01M 10/0525; H01M 2004/021; H01M 2004/027; H01M 2004/028
See application file for complete search history.

(56) References Cited

U.S. PATENT DOCUMENTS

2010/0159346 A1    6/2010   Hinago et al.
2010/0183950 A1    7/2010   Dai
(Continued)

FOREIGN PATENT DOCUMENTS

CN    101507930 A    8/2009
CN    103367765 A    10/2013
(Continued)

OTHER PUBLICATIONS

Al Salem et al., "Electrocatalytic polysulfide-traps for controlling redox shuttle process of Li-S battery", Journal of the American Chemical Society, 2015, vol. 137, No. 36, pp. 11542-11545 (Total No. pp. 6).
(Continued)

*Primary Examiner* — Matthew J Merkling
(74) *Attorney, Agent, or Firm* — Birch, Stewart, Kolasch & Birch, LLP

(57) ABSTRACT

A lithium secondary battery is provided and, more specifically, a lithium secondary battery comprising a cathode catalyst including a transition metal composite having a stable structure in which four nitrogens are bonded to the transition metal as a cathode catalyst for a reduction reaction of sulfur generated during operation of the lithium secondary battery having a sulfur-containing material included in a cathode thereof, thereby improving performance and longevity of the battery.

15 Claims, 12 Drawing Sheets

(51) Int. Cl.
*H01M 10/0525* (2010.01)
*H01M 4/02* (2006.01)

(52) U.S. Cl.
CPC ............ *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2010/0323272 A1* | 12/2010 | Ozaki | H01M 4/8605 423/384 |
| 2011/0206992 A1 | 8/2011 | Campbell et al. | |
| 2011/0245071 A1* | 10/2011 | Tanabe | B01J 37/086 502/180 |
| 2012/0315553 A1 | 12/2012 | Mizuno et al. | |
| 2013/0029234 A1 | 1/2013 | Roev et al. | |
| 2013/0309561 A1* | 11/2013 | Chen | H01M 4/60 977/734 |
| 2013/0330611 A1* | 12/2013 | Chen | H01M 4/608 977/734 |
| 2014/0072871 A1 | 3/2014 | Chen et al. | |
| 2014/0356736 A1 | 12/2014 | Choi et al. | |
| 2016/0190606 A1 | 6/2016 | Kim et al. | |
| 2017/0338472 A1 | 11/2017 | Zhamu et al. | |
| 2018/0175395 A1 | 6/2018 | Lee et al. | |
| 2019/0051940 A1 | 2/2019 | Park et al. | |
| 2019/0267625 A1 | 8/2019 | Lee et al. | |
| 2022/0006131 A1* | 1/2022 | Kim | H01M 50/414 |
| 2023/0055011 A1* | 2/2023 | Lee | C01B 32/05 |

FOREIGN PATENT DOCUMENTS

| | | |
|---|---|---|
| CN | 104319395 A | 1/2015 |
| CN | 105453307 A | 3/2016 |
| CN | 105720235 A | 6/2016 |
| CN | 107534184 A | 1/2018 |
| CN | 107768638 A | 3/2018 |
| JP | 2004-342337 A | 12/2004 |
| JP | 2011-225431 A | 11/2011 |
| JP | 2012-84490 A | 4/2012 |
| JP | 2016-12406 A | 1/2016 |
| JP | 2016-190233 A | 11/2016 |
| KR | 10-2013-0014650 A | 2/2013 |
| KR | 10-2014-0140686 A | 12/2014 |
| KR | 10-1622093 B1 | 5/2016 |
| KR | 10-1654136 B1 | 9/2016 |
| KR | 10-2017-0023304 A | 3/2017 |
| KR | 10-2017-0023305 A | 3/2017 |
| KR | 10-2018-0013499 A | 2/2018 |
| KR | 10-2018-0061034 A | 6/2018 |
| KR | 10-2018-0072122 A | 6/2018 |
| KR | 10-2018-0133063 A | 12/2018 |
| WO | WO 2008/123380 A1 | 10/2008 |
| WO | WO 2011/101992 A1 | 8/2011 |
| WO | WO 2018/132937 A1 | 7/2018 |

OTHER PUBLICATIONS

International Search Report issued in PCT/KR2019/014941 (PCT/ISA/210), dated Feb. 17, 2020.
Lim et al., "Synergistic Effect of Molecular-Type Electrocatalysts with Ultrahigh Pore Volume Carbon Microspheres for Lithium-Sulfur Batteries", ACS Nano, 2018, vol. 12, No. 6, pp. 6013-6022 (Total No. pp. 36).
Extended European Search Report for European Application No. 19882101.9, dated Nov. 15, 2021.

* cited by examiner

【Figure 1】
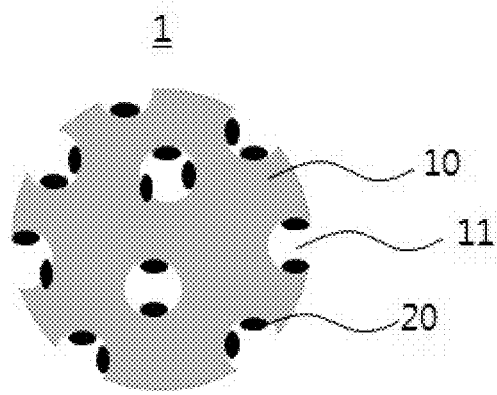
【Figure 2】
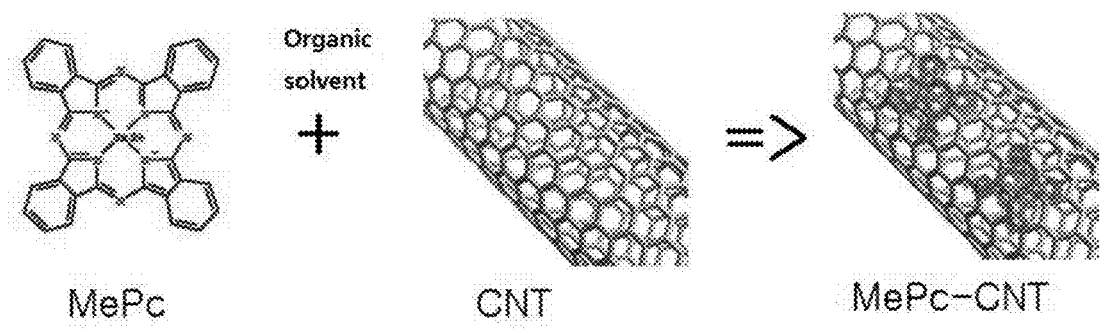
【Figure 3】
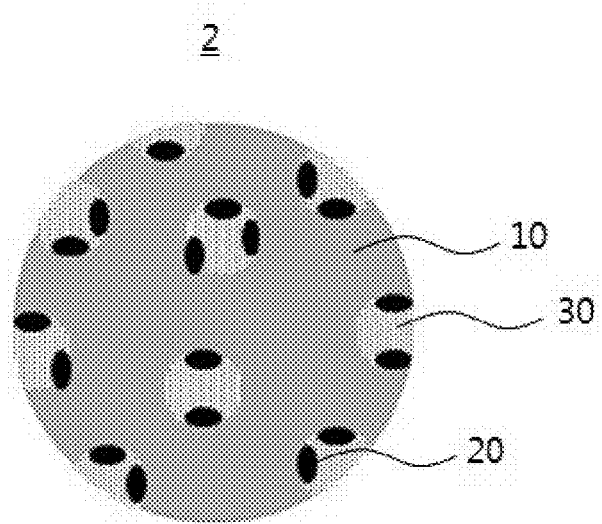

[Figure 4]
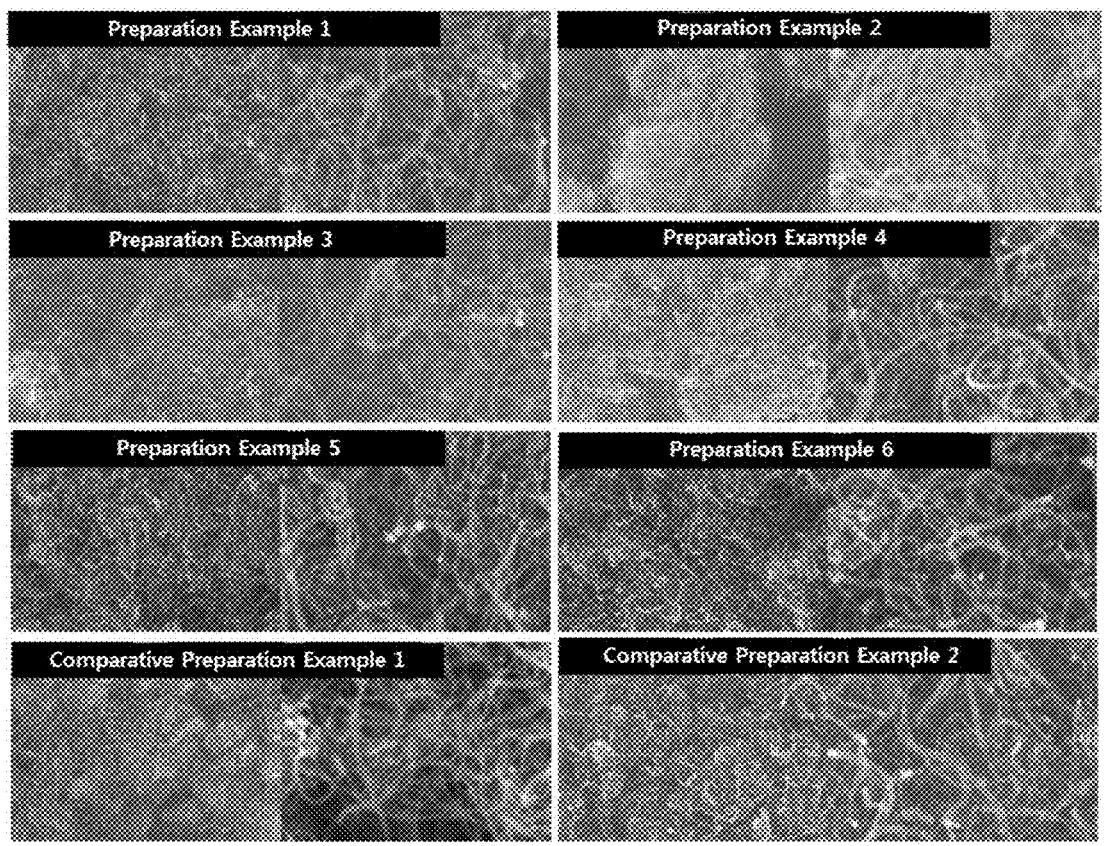
[Figure 5]
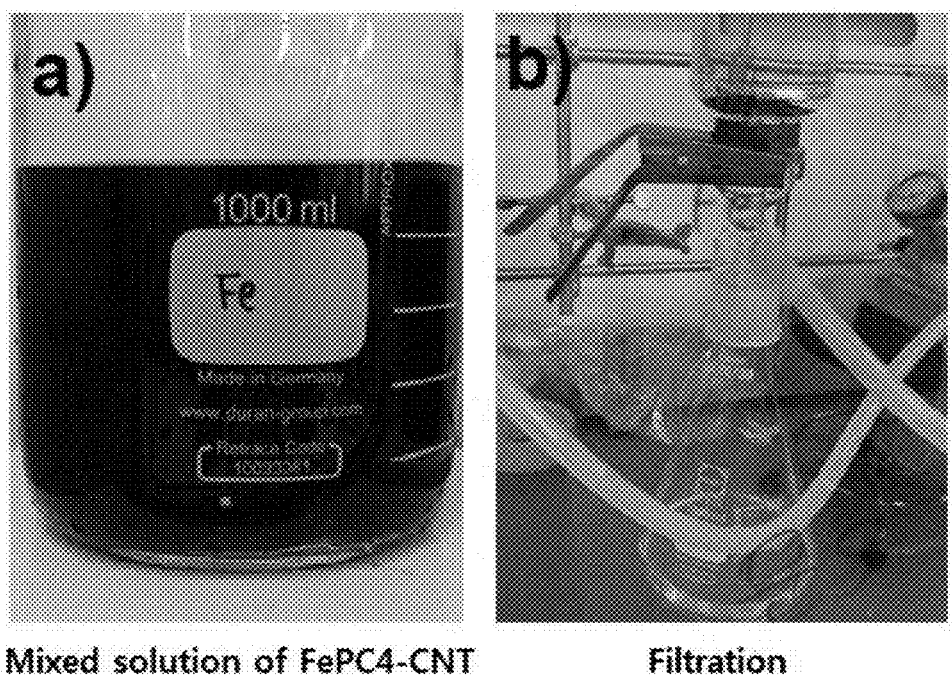
Mixed solution of FePC4-CNT          Filtration 【Figure 6】
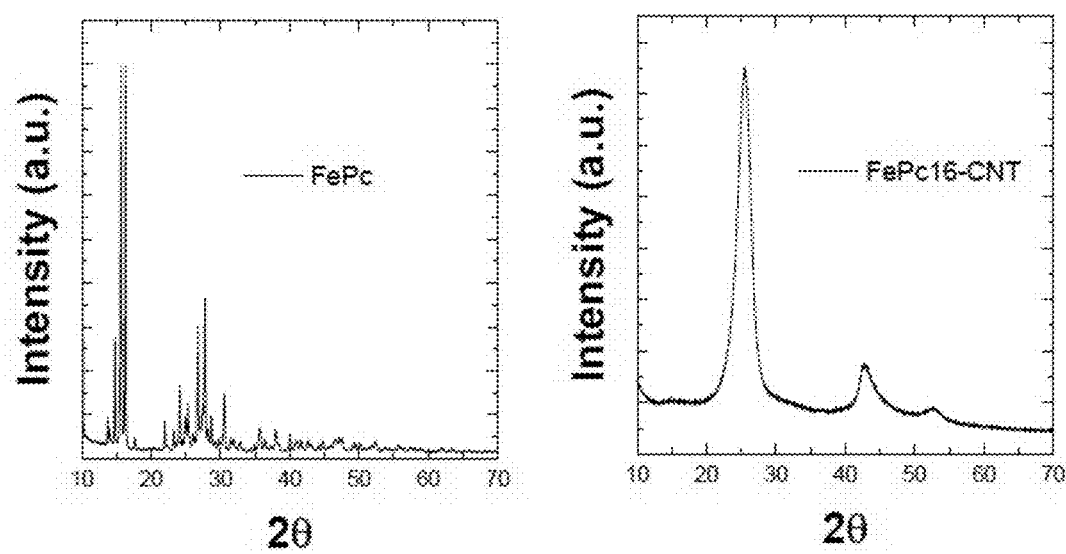
【Figure 7】
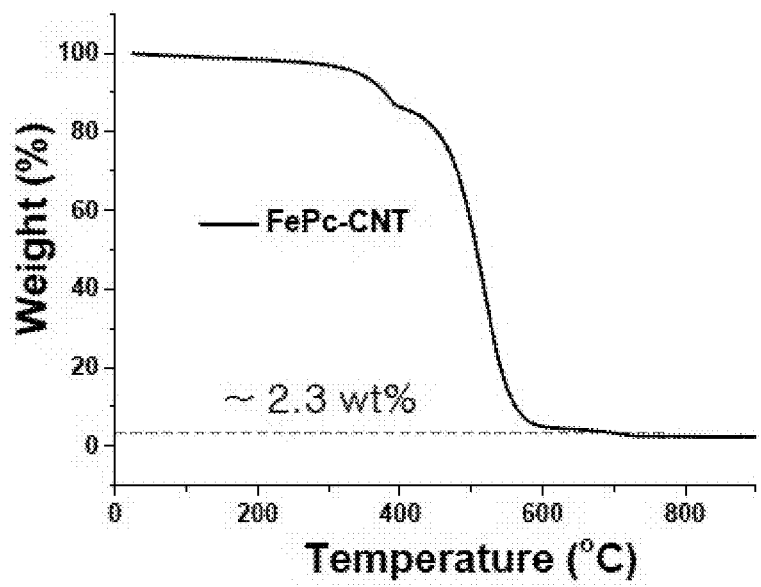

[Figure 8a]
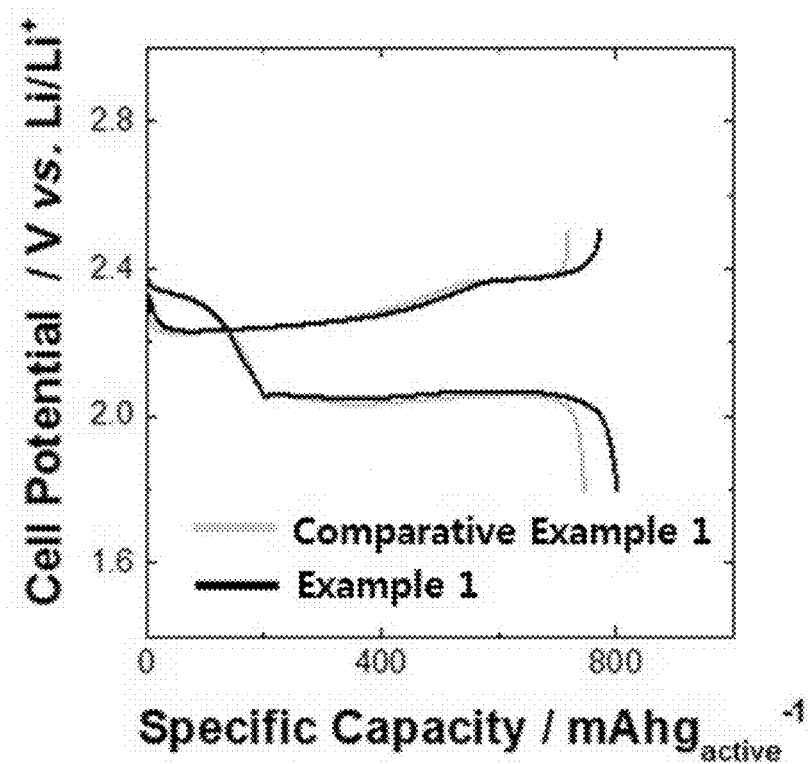
[Figure 8b]
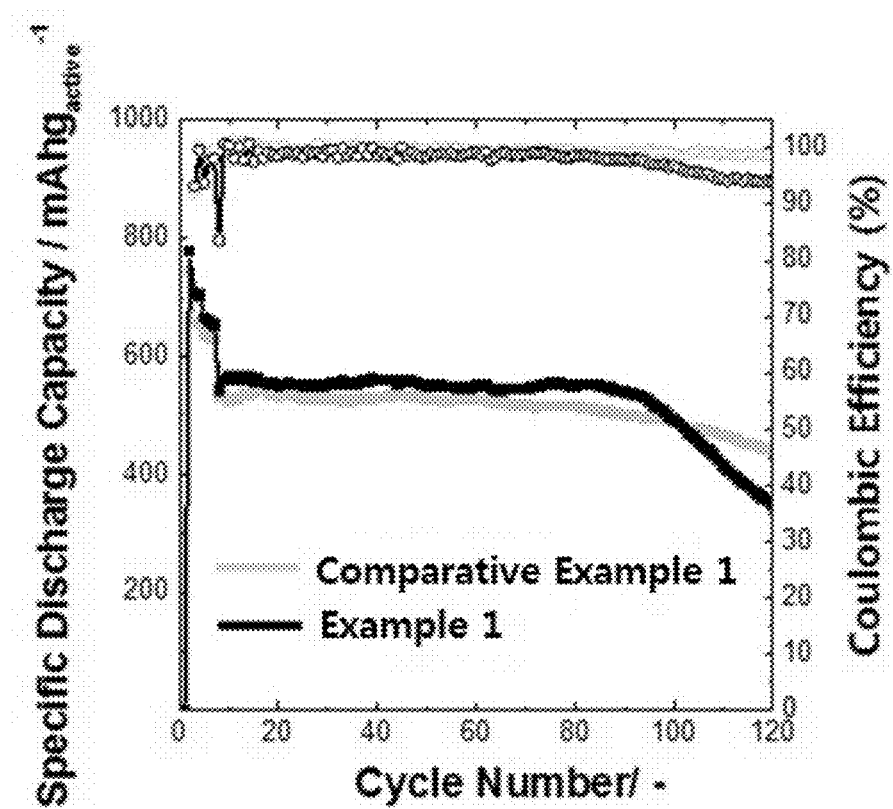

[Figure 9a]
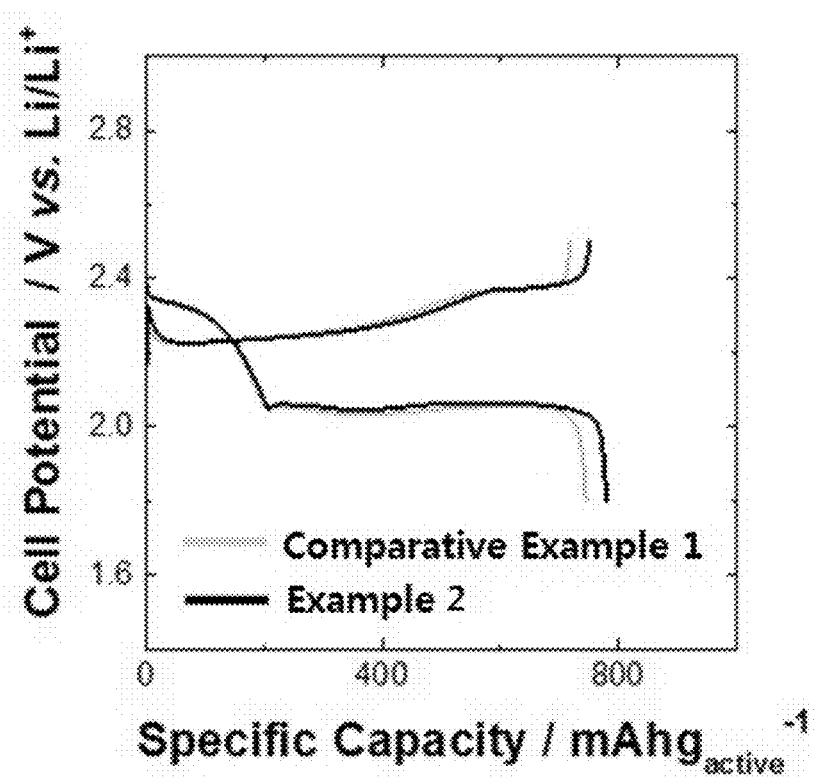

[Figure 9b]
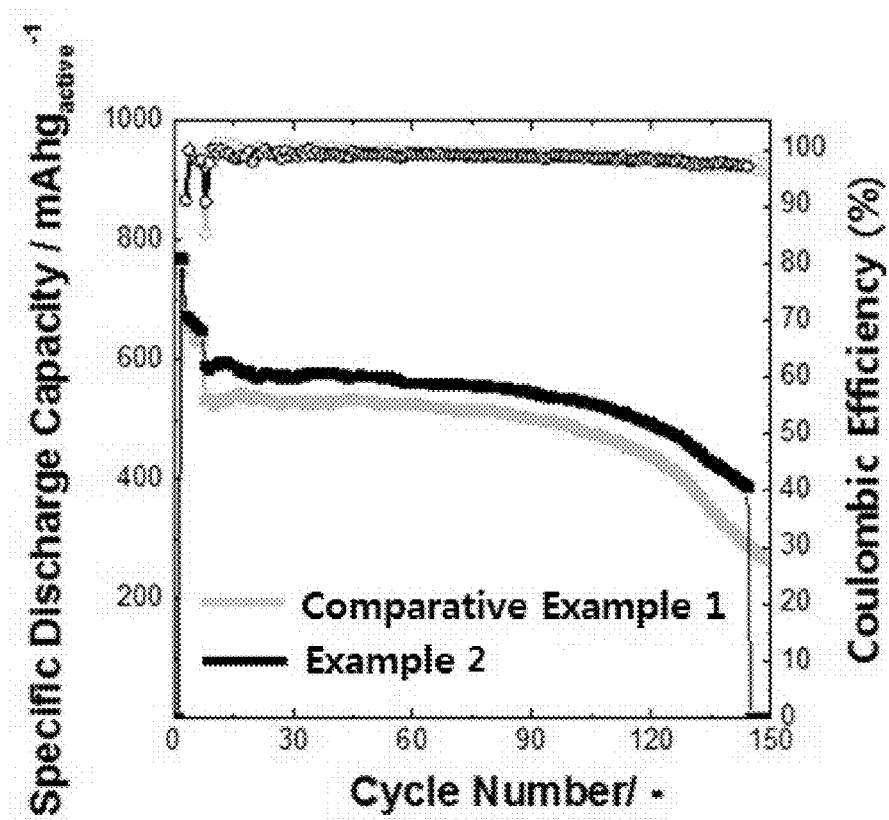

[Figure 10a]
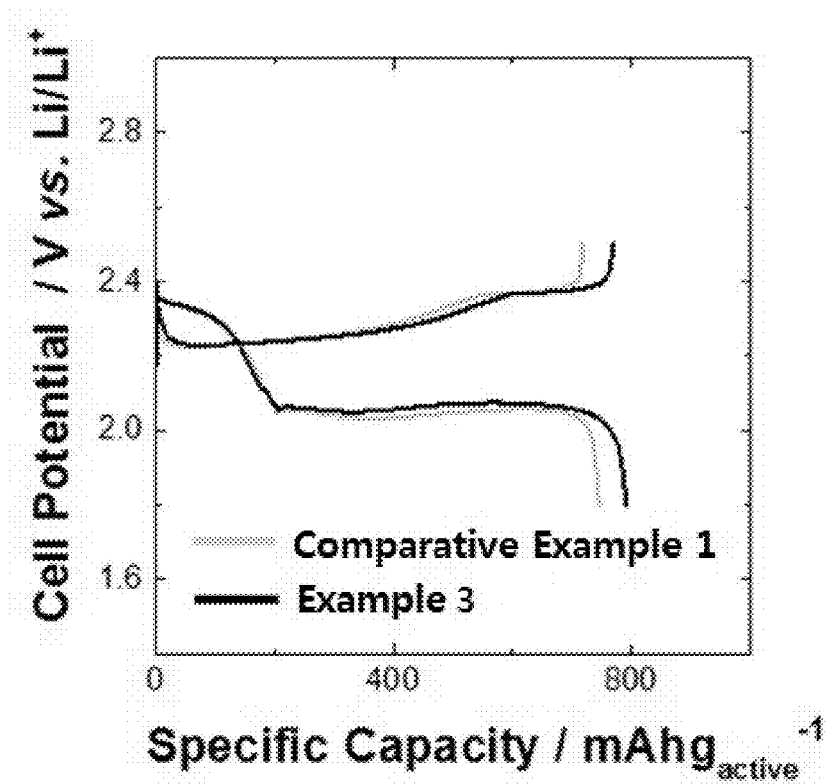

[Figure 10b]
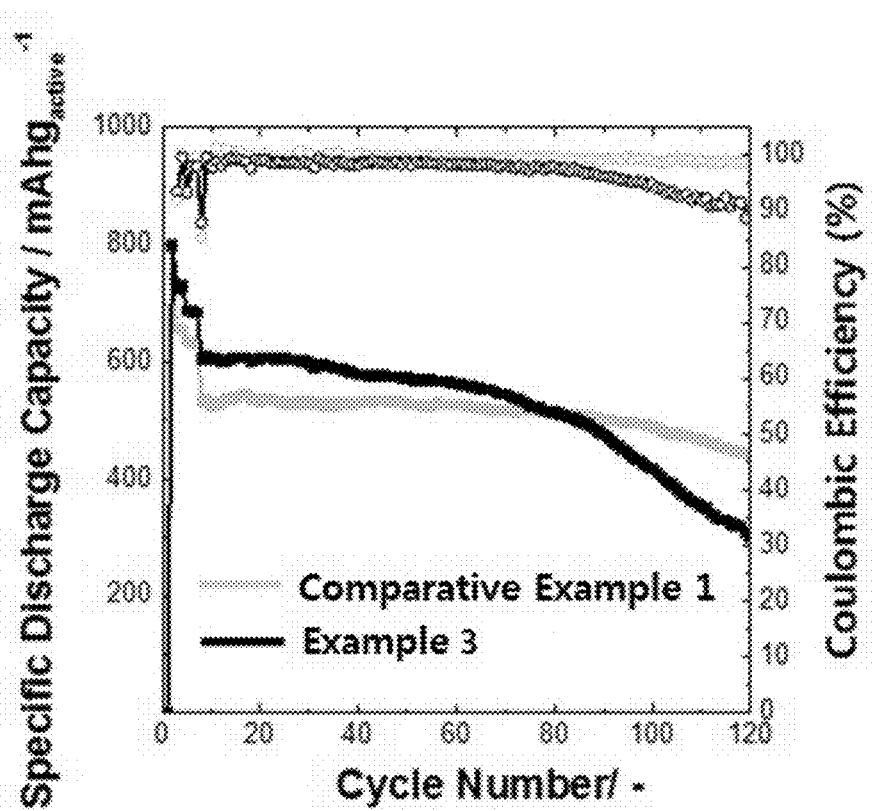

[Figure 11a]
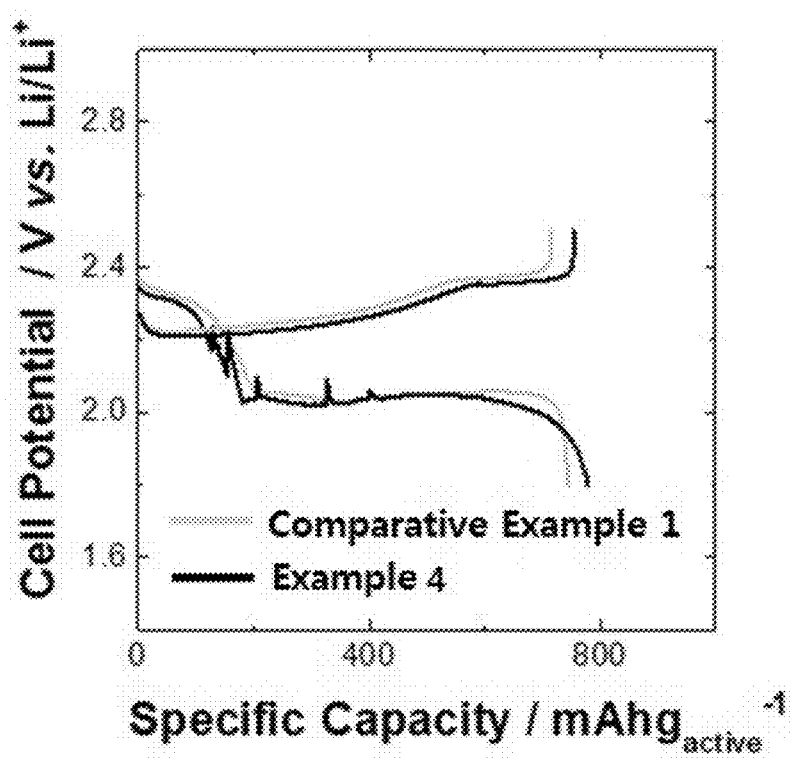

[Figure 11b]
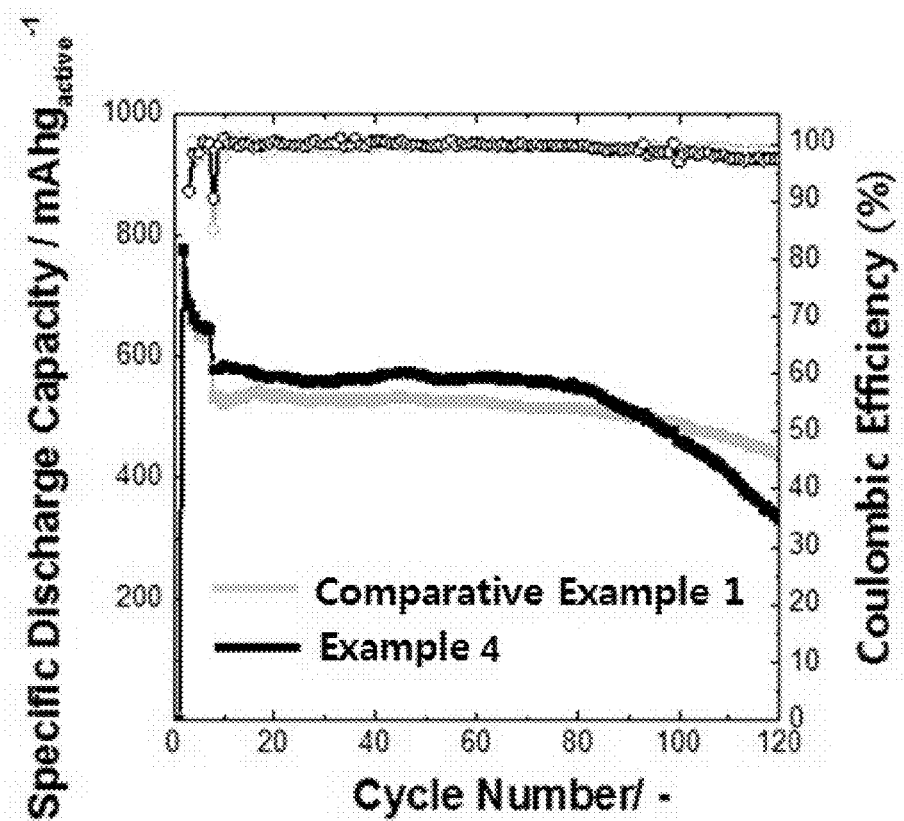
[Figure 12a]
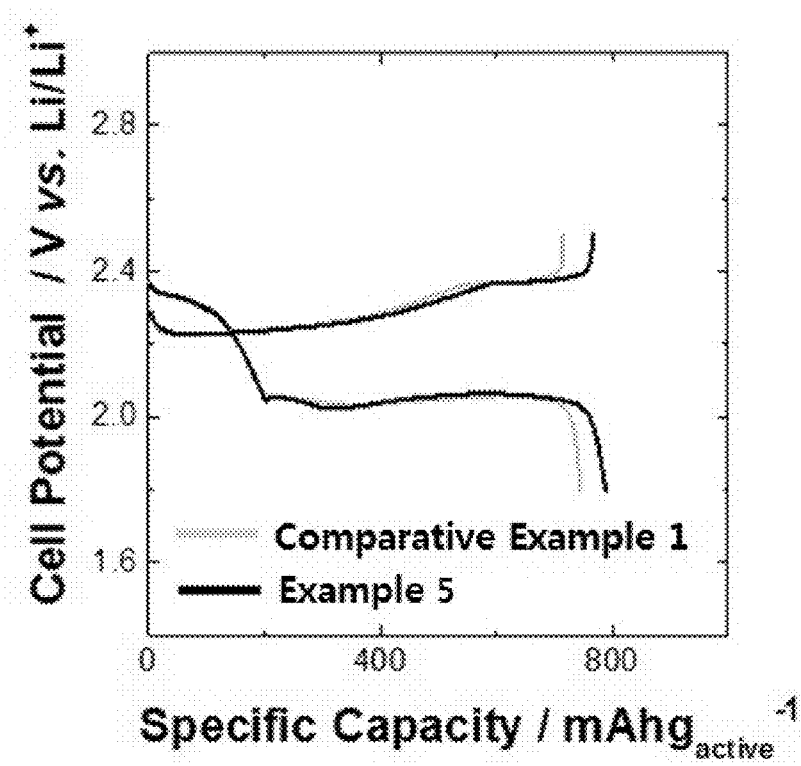

[Figure 12b]
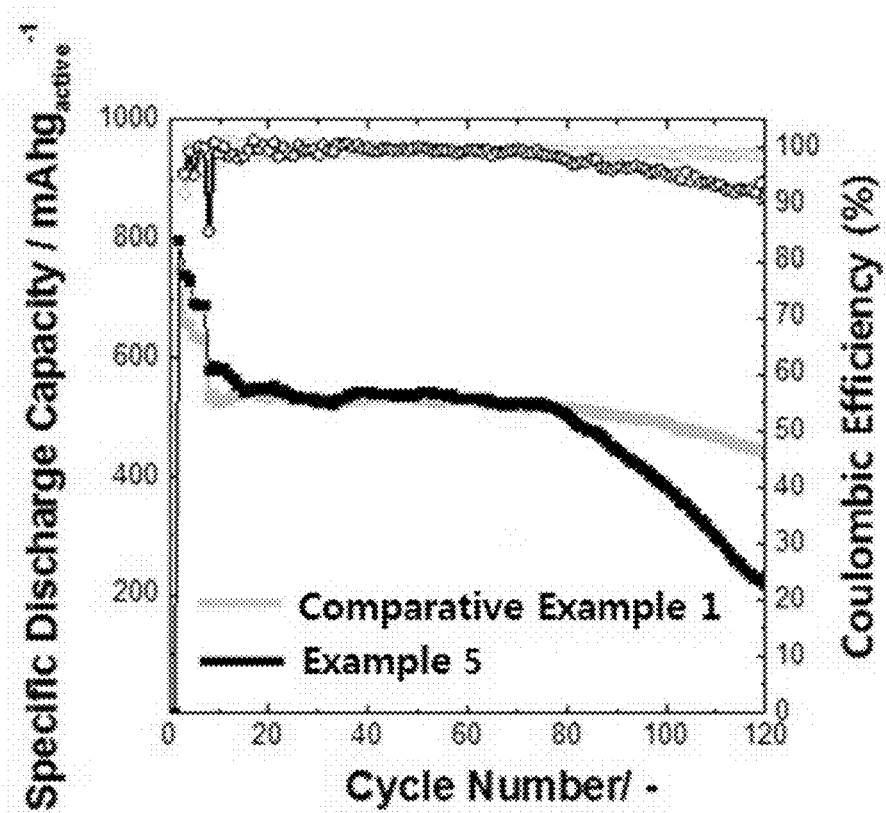

[Figure 13a]
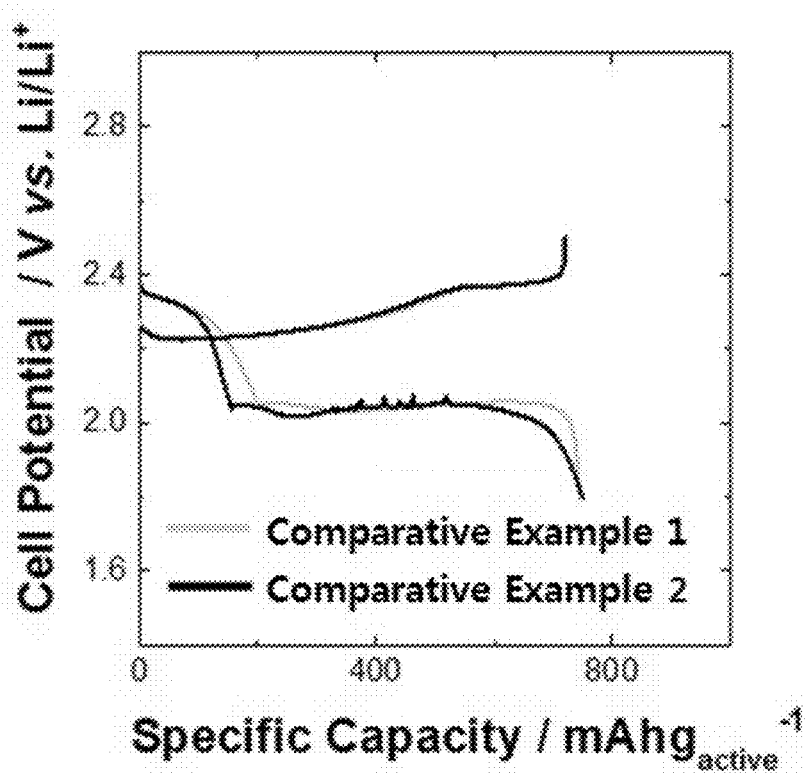
[Figure 13b]
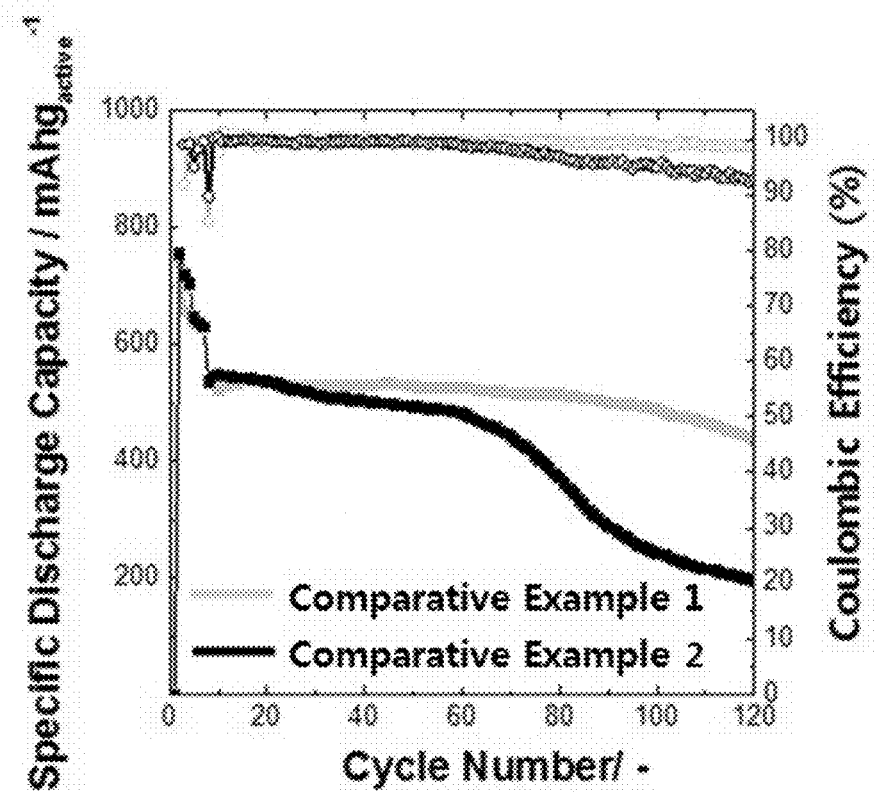

LITHIUM SECONDARY BATTERY

TECHNICAL FIELD

This application claims the benefits of priorities based on Korean Patent Application No. 10-2018-0135536 filed on Nov. 7, 2018, Korean Patent Application No. 10-2018-0135538 filed on Nov. 7, 2018, and Korean Patent Application No. 10-2019-0139543 filed on Nov. 4, 2019, the entire contents of which are incorporated herein by reference.

The present invention relates to a lithium secondary battery comprising a positive electrode catalyst that may facilitate the commercialization and high performance of the battery by promoting a chemical reaction occurring in the electrode.

BACKGROUND ART

Until a recent date, there has been considerable interest in developing batteries with high energy densities using lithium as a negative electrode. For example, as compared to other electrochemical systems with a lithium inserted carbon negative electrode and a nickel or cadmium electrode that reduce the energy density of the battery by increasing the weight and volume of the negative electrode due to the presence of the non-electroactive material, since lithium metal has low weight and high capacity characteristics, lithium metal has attracted much attention as a negative electrode active material for electrochemical batteries. Lithium metal negative electrode, or negative electrodes, which mainly comprise lithium metal, provide the opportunity to construct a battery that is lighter and has a higher energy density than the battery such as a lithium-ion, nickel metal hydride or nickel-cadmium battery. These features are highly desirable for batteries for portable electronic devices, such as cell phones and lap-top computers, where premiums are paid with low weighted value.

Positive electrode active materials of these types for lithium batteries are known and comprise a sulfur-containing positive electrode active material containing a sulfur-sulfide bond, and achieve high energy capacity and rechargeability from electrochemical cleavage (reduction) and reforming (oxidation) of sulfur-sulfur bonds.

Since there are advantages that the lithium-sulfur secondary battery using lithium and alkali metal as a negative electrode active material and sulfur as a positive electrode active material as described above has theoretical energy density of 2,800 Wh/kg and theoretical capacity of sulfur of 1,675 mAh/g, which is much higher than other battery systems, and sulfur is rich in resources, is cheap and is an environmentally friendly substance, the lithium-sulfur secondary battery is attracting attention as a portable electronic device.

However, there were problems that since sulfur used as a positive electrode active material of the lithium-sulfur secondary battery is nonconductor, it is difficult to transfer electrons generated by electrochemical reaction, and that the lifetime characteristics and rate characteristics of the battery are inhibited due to the leaching issue of poly sulfide ($Li_2S_8$~$Li_2S_4$) during charging/discharging and the slow kinetic of electrochemical reactions by the low electrical conductivity of sulfur and lithium sulfide ($Li_2S_2$/$Li_2S$).

In this regard, recently, in the charging/discharging process of the lithium-sulfur secondary battery using platinum (Pt) which has been widely used as an electrochemical catalyst, a study on the implementation of a high performance lithium-sulfur secondary battery by improving the kinetic of the redox reaction of sulfur has been reported (Hesham Al Salem et al.: "Polysulfide Traps for Controlling Redox Shuttle Process of Li—S Batteries": J. Am. Chem. Soc., 2015, 137, 11542).

However, since precious metal catalysts such as platinum are expensive, they are not only difficult materials to commercialize, but they have also a problem of being poisoned by the redox reaction of sulfur in the charging/discharging process, thereby making it difficult to use as a positive electrode material for a lithium-sulfur secondary battery.

Therefore, there is a continuous demand for technology development for a positive electrode material that can improve the kinetic of the electrochemical reaction during charging and discharging of the lithium-sulfur secondary battery and also is advantageous for commercialization in terms of cost.

PRIOR ART DOCUMENT

Patent Documents (Patent document 1) Korean Patent Publication No. 2013-0014650

(Patent document 2) Korean Patent Publication No. 2018-0013499

(Patent document 3) Korean Patent Publication No. 2017-0023304

DISCLOSURE

Technical Problem

As a result of various studies to solve the above problems, the inventors of the present invention confirmed that the performance and lifetime characteristics of the lithium secondary battery may be improved by introducing a transition metal composite containing a transition metal and a doping element onto the outer surface of the porous carbon and the inner surface of its pores, as a catalyst for the reduction of sulfur generated at the positive electrode when discharging the lithium secondary battery containing sulfur-containing material at the positive electrode, wherein the transition metal composite is a stable transition metal composite having four nitrogen atoms bonded to the transition metal among the transition metal composites.

Therefore, one embodiment of the present invention is to provide a lithium secondary battery comprising a positive electrode catalyst suitable as a catalyst for the reduction of sulfur.

Technical Solution

In order to achieve the above objects, one embodiment of the present invention provides a lithium secondary battery comprising a positive electrode containing a sulfur-containing material, a negative electrode, a separator interposed between the positive electrode and the negative electrode, and an electrolyte solution, wherein the positive electrode further comprises a positive electrode catalyst comprising a transition metal composite bonded to a surface of a porous carbon, and wherein the transition metal composite contains four nitrogen atoms bonded to the transition metal.

The positive electrode further comprises a current collector; and a positive electrode active material layer on the current collector, wherein the positive electrode active material layer comprises a positive electrode active material, and the positive electrode catalyst may be contained in the positive electrode active material layer.

The positive electrode catalyst may be present in an amount of 20% by weight to 30% by weight based on a total weight of the positive electrode active material.

The transition metal may be at least one selected from the group consisting of Fe, Ni, Mn, Cu, and Zn.

The transition metal composite may be present in an amount of 1% by weight to 20% by weight based on a total weight of the positive electrode catalyst.

The transition metal composite may be bonded to at least one position of the surface of the porous carbon and an inner surface of pores of the porous carbon.

The transition metal composite may be adsorbed and bonded to the surface of the porous carbon by n-n interaction.

The porous carbon may comprise at least one selected from the group consisting of activated carbon, carbon nanotube (CNT), graphene, carbon black, acetylene black, graphite, graphite nanofiber (GNF) and fullerene.

The pore size of the porous carbon may be 2 to 50 nm.

Advantageous Effects

The lithium secondary battery according to one embodiment of the present invention contains a sulfur-containing material as a positive electrode active material, so that a reduction of sulfur occurs at the positive electrode during operation of the battery. Therefore, the lithium secondary battery according to the present invention has an effect of improving the initial discharging capacity and lifetime characteristics of the battery by comprising a positive electrode catalyst in an appropriate amount to improve the reaction rate (kinetic) of the reduction of sulfur.

The positive electrode catalyst according to the present invention may have an improved efficiency as a catalyst for the reduction of sulfur due to a structure in which a transition metal composite having a stable structure in which four nitrogen atoms are bonded to the transition metal is formed.

In addition, when preparing a positive electrode catalyst, it is possible to produce the positive electrode catalyst by a simple process by using metal-phthalocyanine, without the additional process of bonding four nitrogen atoms to the transition metal.

In addition, in the positive electrode catalyst, since the transition metal composite is adsorbed on the surface of the porous carbon by π-π interaction, it may exhibit an effect of maintaining the physical and chemical properties of the porous carbon as it is.

In addition, the positive electrode catalyst may be used as a catalyst for the reduction of sulfur, and is advantageous for commercialization by binding a relatively inexpensive transition metal in place of expensive platinum used as a conventional catalyst to the surface of the porous carbon.

In addition, the positive electrode catalyst has a shape formed by binding a transition metal composite containing a transition metal and nitrogen to the outer surface of the porous carbon and the inner surface of its pores, and has a low possibility of toxicity to redox reaction of sulfur due to the nature of the material of the positive electrode catalyst, thereby being suitable for application as a positive electrode material of a lithium secondary battery, for example, a lithium-sulfur secondary battery. In particular, the positive electrode catalyst carries sulfur as a positive electrode active material in the pores of the porous carbon, and thus may be applied as a positive electrode material for a lithium-sulfur secondary battery.

In addition, since the transition metal composite has a molecular size, even when bonded to the inner surface of the pores of the porous carbon, it is possible to prevent the pore volume and size of the porous carbon from being reduced, and thus it may prevent the clogging phenomenon of pores when loading the positive electrode active material for the lithium-sulfur secondary battery, such as sulfur.

The lithium-sulfur secondary battery having such a positive electrode catalyst introduced thereto may have high performance due to the activation of the reduction of sulfur generated from the positive electrode.

DESCRIPTION OF DRAWINGS

FIG. 1 is a schematic view showing a longitudinal section of the positive electrode catalyst according to an embodiment of the present invention.

FIG. 2 is a schematic view showing a method of preparing the positive electrode catalyst according to an embodiment of the present invention.

FIG. 3 is a schematic view showing a longitudinal section of the positive electrode active material according to an embodiment of the present invention.

FIG. 4 is a photograph by a scanning electron microscope (SEM) of the positive electrode catalysts prepared in Preparation Examples 1 to 6 and Comparative Preparation Examples 1 and 2, respectively.

FIG. 5 is a photograph showing a mixed solution (mixture of FePC4-CNT) formed by dissolving precursor (FePC) of the transition metal composite and porous carbon (CNT) in an organic solvent (DMF) and the filtering process in Preparation Example 1.

FIG. 6 is a graph of x-ray diffraction (XRD) for the precursor (FePC) of the transition metal composite and positive electrode catalyst (FePC16-CNT) used in Preparation Example 6.

FIG. 7 is a graph of thermogravimetric analysis (TGA) for the positive electrode catalyst (FePC16-CNT) prepared in Preparation Example 6.

FIGS. 8a and 8b are graphs showing initial discharging capacity (FIG. 8a) and coulombic efficiency (FIG. 8b) of lithium-sulfur secondary batteries prepared in Example 1 and Comparative Example 1, respectively.

FIGS. 9a and 9b are graphs showing initial discharging capacity (FIG. 9a) and coulombic efficiency (FIG. 9b) of lithium-sulfur secondary batteries prepared in Example 2 and Comparative Example 1, respectively.

FIGS. 10a and 10b are graphs showing initial discharging capacity (FIG. 10a) and coulombic efficiency (FIG. 10b) of lithium-sulfur secondary batteries prepared in Example 3 and Comparative Example 1, respectively.

FIGS. 11a and 11b are graphs showing initial discharging capacity (FIG. 11a) and coulombic efficiency (FIG. 11b) of lithium-sulfur secondary batteries prepared in Example 4 and Comparative Example 1, respectively.

FIGS. 12a and 12b are graphs showing initial discharging capacity (FIG. 12a) and coulombic efficiency (FIG. 12b) of lithium-sulfur secondary batteries prepared in Example 5 and Comparative Example 1, respectively.

FIGS. 13a and 13b are graphs showing initial discharging capacity (FIG. 13a) and coulombic efficiency (FIG. 13b) of lithium-sulfur secondary batteries prepared in Comparative Example 2 and Comparative Example 1, respectively.

BEST MODE

Hereinafter, the present invention will be described in detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Lithium Secondary Battery

One embodiment of the present invention relates to a lithium secondary battery comprising a positive electrode containing a sulfur-containing material, a negative electrode, a separator interposed between the positive electrode and the negative electrode, and an electrolyte solution, wherein the positive electrode comprises a positive electrode catalyst comprising a transition metal composite bonded to the surface of the porous carbon, and wherein the transition metal composite contains four nitrogen atoms bonded to the transition metal.

The positive electrode catalyst may be contained in an amount of 20 to 30% by weight, preferably 22 to 28% by weight based on the total weight of the positive electrode active material in the positive electrode for the lithium secondary battery. If the amount of the positive electrode catalyst is less than the above range, the catalytic activity for the reduction reaction of sulfur is reduced and thus the effect of improving the performance and lifetime characteristics of the battery is insignificant. If the amount of the positive electrode catalyst exceeds the above range, the phenomenon of lowering the capacity of the battery may occur.

The lithium secondary battery may be a lithium-sulfur secondary battery because it contains a sulfur-containing material in the positive electrode.

In the present invention, the positive electrode may comprise a positive electrode current collector and a positive electrode active material layer formed on the positive electrode current collector.

The positive electrode current collector may be foamed aluminum, foamed nickel, or the like having excellent electrical conductivity.

The positive electrode active material layer may comprise a positive electrode active material comprising the sulfur-containing material, and the positive electrode catalyst described above. In addition, the positive electrode active material layer may further comprise a conductive material for smoothly moving electrons in the positive electrode together with the positive electrode active material, and a binder for increasing the binding force between the positive electrode active materials or between the positive electrode active material and the positive electrode current collector.

The sulfur-containing material contained in the positive electrode active material may comprise an elemental sulfur ($S_8$), a sulfur-based compound, or a mixture thereof. Specifically, the sulfur-based compound may be $Li_2S_n$ (n is a real number of 1 or more), an organic sulfur compound, a carbon-sulfur polymer (($C_2S_x$)$_n$, x is a real number from 2.5 to 50 and n is a real number of two or more), or the like.

The positive electrode active material may be contained in an amount of 60 to 90% by weight based on the total weight of the positive electrode active material layer. If the amount of the positive electrode active material is less than the range, the capacity of the battery is lowered. If the amount of the positive electrode active material exceeds the range, overvoltage may occur.

In addition, the electrically conductive material may be a carbon-based material such as carbon black, acetylene black, Ketjen black; or an electrically conductive polymer such as polyaniline, polythiophene, polyacetylene, and polypyrrole.

The electrically conductive material may be contained in an amount of 5 to 20% by weight based on the total weight of the positive electrode active material layer. If the content of the electrically conductive material is less than 5% by weight, the effect of improving the conductivity according to the use of the electrically conductive material is insignificant. On the other hand, if the content of the electrically conductive material exceeds 20% by weight, since the content of the positive electrode active material is relatively small, there exists a possibility that capacity characteristics are degraded.

In addition, the binder may be poly(vinyl acetate), polyvinyl alcohol, polyethylene oxide, polyvinylpyrrolidone, alkylated polyethylene oxide, crosslinked polyethylene oxide, polyvinyl ether, poly(methyl methacrylate), polyvinylidene fluoride, copolymers (product name: Kynar) of polyhexafluoropropylene and polyvinylidene fluoride, poly(ethylacrylate), polytetrafluoroethylene, polyvinylchloride, polyacrylonitrile, polyvinylpyridine, polystyrene, and derivatives, blends, and copolymers thereof. The binder may be preferably contained in an amount of 5 to 20% by weight based on the total weight of the positive electrode active material layer. If the content of the binder is less than 5% by weight, the effect of improving the binding force between the positive electrode active materials or between the positive electrode active material and the positive electrode current collector according to the use of the binder is insignificant. On the other hand, if the content of the binder exceeds 20% by weight, since the content of the positive electrode active material is relatively small, there exists a possibility that capacity characteristics are degraded.

The positive electrode as described above may be prepared according to a conventional method, and specifically, may be prepared by coating a composition for forming a positive electrode active material layer prepared by mixing the positive electrode active material, the positive electrode catalyst, the electrically conductive material and a binder in an organic solvent, on the positive electrode current collector, followed by drying and optionally rolling.

In this case, it is preferable that the organic solvent may uniformly disperse the positive electrode active material, the positive electrode catalyst, the binder, and the electrically conductive material, and may be easily evaporated. Specifically, acetonitrile, methanol, ethanol, tetrahydrofuran, water, isopropyl alcohol and the like may be used as the organic solvent.

In the present invention, the negative electrode may be a lithium metal thin film, or may comprise a negative electrode current collector and a negative electrode active material layer formed on the negative electrode current collector.

The negative electrode current collector may be selected from the group consisting of copper, aluminum, stainless steel, titanium, silver, palladium, nickel, alloys thereof, and combinations thereof. The stainless steel may be surface-treated with carbon, nickel, titanium, or silver, and the alloy may be an aluminum-cadmium alloy. In addition to those, a nonconductive polymer, the surface of which is treated with sintered carbon, i.e. a conductive material, or a conductive polymer, etc. may be used.

The negative electrode active material layer may comprise one selected from the group consisting of a material capable of reversibly intercalating or deintercalating lithium ion, a material capable of reversibly forming lithium containing compounds by reacting with lithium ion, or lithium metal or lithium alloy As the material capable of reversibly intercalating/deintercalating lithium ion, any carbon-based negative electrode active material generally used in the lithium-sulfur secondary battery may be used, and specific examples thereof may be crystalline carbon, amorphous carbon or a mixture thereof. In addition, the material capable of reacting with lithium ion to reversibly form lithium containing compounds may be, for example, but is not limited to, tin oxide ($SnO_2$), titanium nitrate, or silicon (Si). The alloy of the lithium metal may specifically be an alloy of lithium with a metal of Si, Al, Sn, Pb, Zn, Bi, In, Mg, Ga, or Cd.

In addition, the negative electrode may further include the electrically conductive material and a binder, optionally together with the negative electrode active material. The type and content of the electrically conductive material and the binder are the same as described above.

In the present invention, the separator is a physical separator having a function of physically separating the electrodes, and may be used without particular limitation as long as it is used as a separator in the conventional lithium secondary battery, and particularly, a separator with low resistance to ion migration in the electrolyte and excellent impregnating ability for the electrolyte is preferable. Specifically, a porous polymer film, for example, a porous polymer film made of a polyolefin-based polymer such as ethylene homopolymer, propylene homopolymer, ethylene/butene copolymer, ethylene/hexene copolymer, and ethylene/methacrylate copolymer, etc. may be used alone or in a laminate thereof, or a conventional porous nonwoven fabric, for example, a nonwoven fabric made of glass fiber, polyethylene terephthalate fiber or the like with high melting point may be used, but are not limited thereto.

In the present invention, the electrolyte solution may comprise an organic solvent and a lithium salt.

Specifically, the organic solvent may be a polar solvent such as an aryl compound, bicyclic ether, acyclic carbonate, sulfoxide compound, lactone compound, ketone compound, ester compound, sulfate compound, sulfite compound and the like.

More specifically, the organic solvent may be 1,2-dimethoxyethane, 1,2-diethoxyethane, 1,2-dibutoxyethane, dioxolane (DOL), 1,4-dioxane, tetrahydrofuran, 2-methyl-tetrahydrofuran, dimethylcarbonate (DMC), diethylcarbonate (DEC), ethylmethylcarbonate (EMC), methylpropylcarbonate (MPC), ethylpropylcarbonate, dipropylcarbonate, butylethylcarbonate, ethylpropanoate (EP), toluene, xylene, dimethyl ether (DME), diethylether, triethylene glycol monomethyl ether (TEGME), triethylene glycol dimethyl ether (TEGDME), diglyme, tetraglyme, hexamethyl phosphoric triamide, gamma-butyrolactone (GBL), acetonitrile, propionitrile, ethylenecarbonate (EC), propylenecarbonate (PC), N-methylpyrrolidone, 3-methyl-2-oxazolidone, acetic acid ester, butyric acid ester and propionic acid ester, dimethyl formamide, sulfolane (SL), methyl sulfolane, dimethyl acetamide, dimethyl sulfoxide, dimethyl sulfate, ethyleneglycol diacetate, dimethyl sulfite, or ethyleneglycol sulfite. Of these, a mixed solvent of triethylene glycol monomethyl ether/dioxolane/dimethyl ether may be more preferable.

In addition, the lithium salt may be used without limitation as long as it is a compound capable of providing lithium ion used in the lithium secondary battery. Specifically, the lithium salt may be $LiPF_6$, $LiClO_4$, $LiAsF_6$, $LiBF_4$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$ (Lithium bis(perfluoroethylsulfonyl)imide, BETI), $LiN(CF_3SO_2)_2$(Lithium bis(Trifluoromethanesulfonyl)imide, LiTFSI), $LiN(C_aF_{2a+1}SO_2)(C_bF_{2b+1}SO_2)$ (wherein a and b are natural numbers, preferably $1 \leq a \leq 20$ and $1 \leq b \leq 20$), lithium poly[4,4'-(hexafluoroisopropylidene) diphenoxy]sulfonylimide (LiPHFIPSI), LiCl, LiI, $LiB(C_2O_4)_2$. Among them, a sulfonyl group-containing imide lithium compound such as LiTFSI, BETI or LiPHFIPSI may be more preferable.

In addition, the lithium salt may be preferably contained in an amount of 10 to 35% by weight based on the total weight of the electrolyte. If the content of the lithium salt is less than 10% by weight, the conductivity of the electrolyte is lowered, and thus the performance of the electrolyte is lowered. If the content of the lithium salt exceeds 35% by weight, there is a problem that the viscosity of the electrolyte is increased and thus the mobility of lithium ions is reduced.

Positive Electrode Catalyst

In the present invention, the positive electrode catalyst may be used as a catalyst for improving the reaction rate (kinetic) of the reduction reaction of sulfur in a lithium secondary battery containing a sulfur-containing material.

The positive electrode catalyst according to the present invention comprises a transition metal composite bonded to the surface of the porous carbon, and the transition metal composite comprises a transition metal and four nitrogen atoms bonded to the transition metal. In this case, since catalytic activity may be controlled by the transition metal composite, the transition metal composite may be called a catalytic site.

Hereinafter, the positive electrode catalyst according to the present invention will be described in more detail with reference to the accompanying drawings.

FIG. 1 is a schematic view showing a longitudinal section of the positive electrode catalyst according to an embodiment of the present invention.

Referring to FIG. 1, the positive electrode catalyst 1 according to an embodiment of the present invention may comprises the porous carbon 10; and the transition metal composite 20 bonded to the surface of the porous carbon 10.

The porous carbon 10 may be a particle-shaped structure having a large number of pores 11, may be made of a large sized material with high electrical conductivity, may have a pore volume and specific surface area sufficient to promote the redox reaction of sulfur, and may also serve as a support for the transition metal composite 20 to maintain or improve performance, durability, and efficiency of the transition metal composite 20.

The porous carbon 10 may be composed of at least one carbon material selected from the group consisting of activated carbon, carbon nanotube (CNT), graphene, carbon black, acetylene black, graphite, graphite nanofiber (GNF) and fullerene.

The pores 11 formed in the porous carbon 10 are partially open, and the inside of the pores 11 may carry an active material of the electrode, specifically, a positive electrode active material for a lithium-sulfur secondary battery.

The porous carbon 10 may be particles having a particle diameter of 1 to 50 µm, preferably 5 to 30 µm. If the particle diameter is less than the above range, the transfer efficiency of lithium ions may decrease due to the penetration and wetting of the electrolyte solution. If the particle diameter exceeds the above range, the pores of the electrode may increase with respect to the weight of the electrode, thereby increasing its volume.

The pores 11 formed in the porous carbon 10 may be mesopores of 2 to 50 nm, preferably 2 to 45 nm, more preferably 2 to 40 nm. If the pore size is less than the above range, a clogging phenomenon of the pores 11 may occur during the impregnation process of sulfur, and in particular, when the positive electrode catalyst 1 is applied to a lithium secondary battery, for example, a lithium-sulfur secondary battery, since the clogging phenomenon of the pores 11 may occur during the impregnation process of the liquid sulfur which is a positive electrode active material, sulfur may not be uniformly carried in each pore, and also, the amount of sulfur carried in the pores 11 may be lowered due to the volume limitation of the pores 11. In addition, if the pore size exceeds the above range, the pores become macropores, and thus the reactant may be leached in the reduction of sulfur. In particular, when the positive electrode catalyst 1 is applied to a lithium secondary battery, for example, a lithium-sulfur secondary battery, polysulfide which is an intermediate product of the positive electrode may be leached during the charging/discharging.

In addition, the volume of the pores 11 contained in the porous carbon 10 may be 0.5 to 3.5 cc/g, preferably 1.0 to 3.0 cc/g, more preferably 1.5 to 2.5 cc/g. If the volume of the pore is less than the above range, a clogging phenomenon of the pores 11 may occur during the impregnation process of sulfur, and in particular, when the positive electrode catalyst 1 is applied to a lithium secondary battery, for example, a lithium-sulfur secondary battery, since the clogging phenomenon of the pores 11 may occur during the impregnation process of the liquid sulfur which is a positive electrode active material, sulfur may not be uniformly carried in each pore, and also, the amount of sulfur carried in the pores 11 may be lowered due to the volume limitation of the pores 11. In addition, if the volume of the pore exceeds the above range, the pores become macropores, and thus the reactant may be leached in the reduction of sulfur. In particular, when the positive electrode catalyst 1 is applied to a lithium secondary battery, for example, a lithium-sulfur secondary battery, polysulfide which is an intermediate product of the positive electrode may be leached during the charging/discharging.

In addition, as the surface area of the porous carbon 10 is increased, it is advantageous for catalytic activity. The surface area of the porous carbon 10 may be specifically 100 to 1200 $m^2$/g, preferably 150 to 500 $m^2$/g. If the surface area of the porous carbon 10 is less than the above range, the catalytic activity may be lowered. If the surface area of the porous carbon 10 exceeds the above range, the durability of the positive electrode catalyst may be lowered.

In addition, the porous carbon 10 may be contained in a range of 80 to 99% by weight, preferably 80 to 95% by weight, more preferably 80 to 90% by weight based on the total content of the positive electrode catalyst 1. If the amount is less than the above range, the durability of the positive electrode catalyst 1 may be degraded. If the amount is above the above range, the catalytic activity may be reduced.

The transition metal composite 20 is a composite formed by binding four nitrogen atoms to a transition metal, which may improve the kinetic by acting as a catalyst for the reduction of sulfur. Therefore, the transition metal composite may be suitable as a catalyst for a positive electrode of a lithium secondary battery, especially a lithium-sulfur secondary battery.

In the transition metal composite 20, if the number of nitrogen bonded to the transition metal is less than four, the activity as a catalyst is lowered, and if the number of nitrogen is more than four, the structural stability is lowered, and thus the catalytic activity for the reduction of sulfur may be reduced.

In addition, when nitrogen is bonded to the transition metal, since it is not only stable but also exhibits excellent catalytic properties, it is possible to exhibit higher stability and catalyst effect than the transition metal composite formed by binding other kinds of elements to the transition metal.

The transition metal composite 20 may be contained in an amount of 1 to 20% by weight, preferably 4 to 16% by weight, based on the total content of the positive electrode catalyst 1. If the amount is less than the above range, the effect of improving the reaction rate of the reduction of sulfur may be reduced, and thus the effect of improving battery performance may be insignificant. If the amount exceeds the above range, even if the content of the transition metal composite 20 is increased, the reaction rate of the reduction of sulfur may no longer be increased.

The transition metal composite 20 may be bonded to at least one position of the outer surface of the porous carbon and the inner surface of the pore. Specifically, the transition metal composite 20 may be adsorbed onto the surface of the porous carbon 10 by $\pi$-$\pi$ interaction. The $\pi$-$\pi$ interaction is not a bond between specific elements but has a binding form between surfaces, and thus may exhibit stronger adsorption than other types of bonds, and thus even if the transition metal composite 20 is bonded to the surface of the porous carbon 10, it is possible to maintain the intrinsic properties of the porous carbon 10.

In the transition metal composite 20, the mole ratio of transition metal and nitrogen may be 1:2 to 10, preferably 1:2 to 8, more preferably 1:3 to 5. If the molar ratio is less than the above range, the transition metal composite may not be sufficiently doped to the surface of the porous carbon 10 as necessary. If the molar ratio is more than the above range, the amount of nitrogen per unit weight of the positive electrode catalyst (1) may be increased, thereby reducing the catalytic activity.

The transition metal composite 20 is an atomic level composite having a size of 0.1 to 1 nm, preferably 0.1 to 0.9 nm, more preferably 0.1 to 0.8 nm, and even when bonded onto the inner surface of the porous carbon 10, there is no reduction in the volume and size of the pores 11, so that the clogging of the pores may be prevented even if an active material is loaded in the pores 11.

The transition metal may be at least one selected from the group consisting of Fe, Ni, Mn, Cu, and Zn, but is not limited thereto as long as it is a transition metal capable of exhibiting catalytic activity for the reduction of sulfur.

The positive electrode catalyst 1 as described above may be widely used as a catalyst for the general reduction of sulfur. In addition, the catalyst may be used as a positive electrode material for a lithium secondary battery, and in particular, the catalyst is also applied to the positive electrode material of the lithium-sulfur secondary battery accompanied with the reduction reaction of sulfur, and thus may realize a high performance battery and may be advantageous for commercialization due to low cost.

Preparation Method of Positive Electrode Catalyst

The present invention also relates to a method for preparing a positive electrode catalyst as described above, and the method for preparing a positive electrode catalyst comprises the steps of (S1) dissolving a precursor of a transition metal composite comprising a transition metal and nitrogen in a solvent; (S2) adding porous carbon to the precursor solution of the transition metal composite obtained in the step (S1) and mixing them; (S3) filtering the mixed solution obtained in the step (S2); and (S4) after the step (S3), drying the powder obtained in the upper layer of the mixed solution.

Hereinafter, the method for preparing the positive electrode catalyst according to the present invention will be described in more detail for each step.

Step (S1)

In step (S1), the precursor solution of the transition metal composite may be prepared by dissolving the precursor of the transition metal composite containing the transition metal and nitrogen in a solvent. Preferably, a precursor solution of the transition metal composite may be prepared by dispersing the precursor of the transition metal composite in a solvent and sonicating the precursor.

The concentration of the precursor solution of the transition metal composite may be 5 to 15%, preferably 5 to 12%, more preferably 5 to 10% based on the weight of the solids. If the concentration is less than the above range, the weight of the transition metal composite contained in the positive electrode catalyst to be prepared is reduced and thus the catalytic activity is not good. If the concentration is greater than the above range, the weight of the transition metal composite contained in the positive electrode catalyst to be prepared may be increased, thereby causing the pores of porous carbon to be clogged.

The precursor of the transition metal composite may be at least one metal-phthalocyanine (MePC) selected from the group consisting of iron phthalocyanine, nickel phthalocyanine, manganese phthalocyanine, copper phthalocyanine, and zinc phthalocyanine.

The metal-phthalocyanine is a type of macrocyclic compound having a structure in which rings of nitrogen atom-carbon atoms are intersected, and the metal-phthalocyanine has a chemical structure in which metal ions are coordinated at the center thereof.

Since the metal-phthalocyanine is used as a precursor of the transition metal composite, it is possible to prepare a positive electrode catalyst containing a transition metal composite with a stable structure in which four nitrogen atoms are bonded to the transition metal. In general, in order to bond four nitrogen atoms to a transition metal, several process steps, such as a step of reacting with the precursor material containing N and also a step of proceeding an additional reaction under an ammonia ($NH_3$) atmosphere must be taken. However, in the present invention, by using a metal-phthalocyanine having a chemical structure as described above as a precursor of the transition metal composite, a positive electrode catalyst comprising a transition metal composite having a stable structure in which four nitrogen atoms are bonded to the transition metal may be prepared as described above.

The solvent may be at least one organic solvent selected from the group consisting of dimethyl carbonate, dimethyl formamide, N-methyl formamide, sulfolane (tetrahydrothiophene-1,1-dioxide), 3-methylsulfolan, N-butyl sulfone, dimethyl sulfoxide, pyridinone (HEP), dimethylpiperidone (DMPD), N-methyl pyrrolidinone (NMP), N-methyl acetamide, dimethyl acetamide (DMAc), N, N-dimethylformamide (DMF), diethylacetamide (DEAc) dipropyl acetamide (DPAc), ethanol, propanol, butanol, hexanol, ethylene glycol, tetrachloroethylene, propylene glycol, toluene, terpentine, methyl acetate, ethyl acetate, petroleum ether, acetone, cresol and glycerol, and preferably, when using DMF as the solvent, the solubility of the precursor of the transition metal composite may be high.

Step (S2)

In step (S2), a porous carbon may be added to and mixed with the precursor solution of the transition metal composite obtained in the step (S1). The morphological characteristics such as the material, pores, and size of the porous carbon are as described above.

The porous carbon as described above may be synthesized by a hard casting method, but is not limited thereto. The porous carbon of the type described above may be synthesized by conventional methods for synthesizing a porous carbon in the art.

Specifically, the porous carbon may be synthesized using a carbon material. At this time, the carbon material used to synthesize the porous carbon and the shape of the porous carbon produced are as described above.

When adding the porous carbon to the precursor solution of the transition metal composite and mixing them, if necessary, the mixed solution may be prepared by stirring and mixing after sonication.

FIG. 2 is a schematic view showing a method of preparing the positive electrode catalyst according to an embodiment of the present invention.

Referring to FIG. 2, a positive electrode catalyst (MePC-CNT) having a transition metal composite bonded to the surface of CNT could be prepared by adding CNT as porous carbon to a solution prepared by dissolving a metal-phthalocyanine (MePC), which is a precursor of the transition metal composite, in an organic solvent.

At this time, in order to ensure that the content of the transition metal composite and porous carbon in the positive electrode catalyst to be prepared satisfy the weight range as described above, their amount used may be properly adjusted during the preparing process.

Step (S3)

In step (S3), the mixed solution obtained in step (S2) may be filtered and washed to remove impurities.

Step (S4)

In step (S4), a positive electrode catalyst may be obtained by drying the powder obtained in the upper layer of the mixed solution after step (S3).

The positive electrode catalyst has a structure comprising a transition metal composite bonded to the surface of the porous carbon. In order to obtain a positive electrode catalyst well-bonded, the drying may be carried out for 10 to 14 hours, preferably 10.5 to 13.5 hours, more preferably 11 to 13 hours, at a temperature of 60 to 100° C., preferably 65 to 95° C., more preferably 70 to 90° C.

Positive Electrode Active Material

The present invention also relates to a positive electrode active material applicable to the positive electrode for a lithium secondary battery. Preferably, the lithium secondary battery may be a lithium-sulfur secondary battery comprising a sulfur-containing material as a positive electrode active material.

FIG. 3 is a schematic view showing a longitudinal section of the positive electrode active material according to an embodiment of the present invention.

Referring to FIG. 3, the positive electrode active material 2 according to an embodiment of the present invention may comprise the positive electrode catalyst as described above; and a sulfur-containing material 30 carried in the inside of the pores 11 of the porous carbon 10 contained in the positive electrode catalyst 1.

The structure and materials of the positive electrode catalyst 1 are as described above.

The sulfur-containing material 30 may be at least one selected from the group consisting of an elemental sulfur ($S_8$) and a sulfur compound. Specifically, the sulfur compound may be selected from $Li_2S_n$ (n is a real number of 1 or more), an organic sulfur compound, or a carbon-sulfur polymer (($(C_2S_x)_n$, x is a real number from 2.5 to 50 and n is a real number of two or more).

Preparation Method of Positive Electrode Active Material

The present invention also relates to a method for preparing the positive electrode active material as described above. The method for preparing the positive electrode active material may comprise the steps of (P1) forming a mixed powder of the positive electrode catalyst and sulfur or a sulfur compound; (P2) mixing the mixed powder with a solvent for dissolving sulfur to form a mixture; and (P3) heat-treating the mixture under vacuum so that sulfur is supported in the pores of the positive electrode catalyst.

Hereinafter, a method of preparing a positive electrode active material according to the present invention will be described in more detail for each step.

Step (P1)

The positive electrode catalyst for preparing the positive electrode active material may be prepared by a method of preparing a positive electrode catalyst comprising the steps (S1) to (S4) as described above.

Both the positive electrode catalyst and sulfur may be mixed in a powder state to obtain a mixed powder. In this case, the positive electrode catalyst and sulfur may be mixed so that the weight of sulfur may be 50 to 80% by weight, preferably 65 to 77% by weight, based on the total weight of the positive electrode active material to be prepared.

Step (P2)

A solvent is mixed with the mixed powder obtained in the step (P1) to form a mixture, wherein as the solvent, a solvent for dissolving sulfur having high solubility for sulfur is used, so that sulfur contained in the mixed powder is dissolved, and thus the dissolved liquid sulfur is carried in the pores present in the porous carbon of the positive electrode catalyst.

At this time, the solvent for dissolving the sulfur may be at least one selected from the group consisting of $CS_2$ solvent, ethylenediamine, acetone and ethanol, and in particular, when using a $CS_2$ solvent, since the selective solubility of sulfur contained in the mixed powder may be high, it may be advantageous to dissolve sulfur to be carried inside the pores contained in the porous carbon.

Step (P3)

The liquid sulfur loaded inside the pores contained in the porous carbon of the positive electrode catalyst may be fixed on the surface of the pores by heat-treating the mixture formed in step (P2) under vacuum.

A positive electrode active material having a form in which sulfur is carried on the positive electrode catalyst may be prepared by steps (P1) to (P3). The positive electrode active material may be applied to the positive electrode of the lithium secondary battery. Preferably, the lithium secondary battery may be a lithium-sulfur secondary battery.

Among the lithium secondary batteries according to the present invention, the lithium-sulfur secondary battery may improve the kinetic of the reduction of sulfur generated at the positive electrode during discharging and thus may implement a lithium-sulfur secondary battery with high performance by introducing the positive electrode catalyst as described above to the positive electrode.

Hereinafter, in order to facilitate understanding of the present invention, preferred examples are presented, but the following examples are intended to illustrate the present invention only. It will be apparent to those skilled in the art that various changes and modifications can be made within the scope and spirit of the present invention, and also it is obvious that such changes and modifications fall within the scope of the appended claims.

Preparation Examples 1 to 6

(1) Preparation of Precursor Solution of Transition Metal Composite (MePC Solution)

Metal-phthalocyanine (MePC, Metal=Fe, Ni, Mn, Cu, Zn, Aldrich company) which is a precursor of the transition metal composite as shown in Table 1 was dispersed in a solvent of N,N-dimethylformamide (DMF), followed by bath sonication for 10 minutes to prepare a MePC solution. At this time, 40 mg of the MePC was dissolved in 500 mL of DMF to prepare the MePC solution.

In this case, MePCs used in Preparation Examples 1 to 6 are referred to as FePC, NiPC, MnPC, CuPC, ZnPC and FePC, respectively.

(2) Mixing of Porous Carbon 960 mg of CNT (CNano company), which is a porous carbon, was added to the MePC solution, followed by bath sonication for 10 minutes, and stirred at 500 rpm for 4 hours at room temperature to obtain a mixed solution.

(3) Filtering and Washing

The mixed solution was filtered with a vacuum pump and washed with 1000 ml of ethanol.

(4) Drying

The upper powder of the filtered and washed mixed solution was dried at 80° C. for 12 hours to prepare a positive electrode catalyst having a transition metal composite (MePC) bonded to CNT.

Comparative Preparation Example 1

A positive electrode catalyst was prepared in the same manner as in Preparation Example 1, except that only CNTs are used, without using positive electrode catalysts formed from precursors of transition metal composites and CNTs.

Comparative Preparation Example 2

A positive electrode catalyst was prepared in the same manner as in Preparation Example 1, except that CoPC is used as metal-phthalocyanine which is a precursor of the transition metal composite.

TABLE 1

|  | Precursor of transition metal composite | Content of transition metal composite (contained in positive electrode catalyst) |
|---|---|---|---|
| Preparation Example 1 | FePC4-CNT | FePC | 4% by weight |
| Preparation Example 2 | NiPC4-CNT | NiPC | 4% by weight |
| Preparation Example 3 | MnPC4-CNT | MnPC | 4% by weight |
| Preparation Example 4 | CuPC4-CNT | CuPC | 4% by weight |
| Preparation Example 5 | ZnPC4-CNT | ZnPC | 4% by weight |
| Preparation Example 6 | FePC16-CNT | FePC | 16% by weight |
| Comparative Preparation Example 1 | CNT | — | — |
| Comparative Preparation Example 2 | CoPC4-CNT | CoPC | 4% by weight |

Examples 1 to 6 and Comparative Examples 1 and 2: Preparation of Lithium Secondary Battery The positive electrode active material, the electrically conductive material and the binder were mixed using a mixer to prepare a composition for forming a positive electrode active material layer. At this time, sulfur was used as the positive electrode active material, carbon black was used as the electrically conductive material, and polyvinyl alcohol was used as the binder. The mixing ratio was set to be a weight ratio of 75:20:5 of positive electrode active material:electrically conductive material:binder. The prepared composition for forming the positive electrode active material layer was applied to an aluminum current collector and dried to obtain positive electrode (energy density of the positive electrode: 1.0 mAh/cm$^2$).

At this time, the positive electrode catalysts prepared in Preparation Examples 1 to 6 and Comparative Preparation Examples 1 to 2 were mixed together to prepare positive electrodes of Examples 1 to 6 and Comparative Examples 1 to 2, respectively. The positive electrode catalyst was set to be 25% by weight based on the total weight of the positive electrode active material.

In addition, a lithium metal thin film was prepared as a negative electrode.

After positioning the positive electrode and the negative electrode to face from each other, a separator of polyethylene was interposed between the positive electrode and the negative electrode.

Thereafter, an electrolyte solution was injected into the case to prepare a lithium-sulfur secondary battery. At this time, the electrolyte solution was an electrolyte solution prepared by mixing LiTFSI, which is a lithium salt, into TEGDME/DOL/DME (1:1:1, vol %:vol %:vol %), an organic solvent, in a weight ratio of LiTFSI:organic solvent of 1:3, and adding LiNO$_3$ in a weight ratio of 1/10 of LiTFSI.

Comparative Example 3

A lithium-sulfur secondary battery was manufactured in the same manner as in Example 1 except that the content of the transition metal composite contained in the positive electrode catalyst was 25% by weight.

Experimental Example 1: Observation of Surface of Positive Electrode Catalyst

The surface of the positive electrode catalysts prepared in Preparation Examples and Comparative Preparation Examples respectively was observed.

FIG. 4 is a photograph by a scanning electron microscope (SEM) of the positive electrode catalysts prepared in Preparation Examples 1 to 6 and Comparative Preparation Examples 1 and 2, respectively.

Referring to FIG. 4, it was found that the positive electrode catalysts of Preparation Examples 1 to 6, which are formed by bonding transition metal composites to porous carbon, and the positive electrode catalyst of Comparative Preparation Example 1, which is a positive electrode catalyst containing porous carbon with no transition metal composite bonded thereto, do not differ in SEM image.

From this, it can be seen that in the case of the positive electrode catalysts of Preparation Examples 1 to 6, the transition metal composites are evenly distributed on the surface of the porous carbon through the π-π interaction. That is, it can be seen that although the transition metal composites have a size of several tens of μm, since there is no difference between the SEM photograph of the positive electrode catalyst having the transition metal composites bonded to the porous carbon and the SEM photograph of the porous carbon having no transition metal composites bonded thereto, the transition metal composites are evenly distributed and bonded on the surface of the porous carbon.

Experimental Example 2: Observation of the Preparing Process of the Positive Electrode Catalyst FIG. 5 is a photograph showing a mixed solution (mixture of FePC4-CNT) formed by dissolving precursor (FePC) of the transition metal composite and porous carbon (CNT) in an organic solvent (DMF) and the process of filtration in Preparation Example 1.

Referring to FIG. 5, it can be seen that FePC is strongly adsorbed to CNT through π-π interaction. In general, FePC has a characteristic of showing a strong blue color even when only a small amount is dispersed in the solution. The mixed solution of FePC4-CNT showed a bluish color, but the blue color was disappeared in the filtered solution. From this, it can be seen that FePC was adsorbed on the CNT.

Experimental Example 3: Structure and Composition Analysis of Positive Electrode Catalyst An experiment for structural analysis of the positive electrode catalyst (FePC4-CNT) prepared in Example 1 was performed.

FIG. 6 is a graph of x-ray diffraction (XRD) for the precursor (FePC) of the transition metal composite and positive electrode catalyst (FePC16-CNT) used in Preparation Example 6.

Referring to FIG. 6, it can be seen that in the case of the positive electrode catalyst (FePC16-CNT) prepared in Preparation Example 6, since the single molecule of FePC was evenly distributed on the CNT, the XRD pattern of FePC did not appear in the XRD of FePC16-CNT.

In addition, an experiment for the component analysis of the positive electrode catalyst (FePC16-CNT) prepared in Preparation Example 6 was carried out.

Thermogravimetric analysis (TGA) is a device that measures the change in mass with increasing temperature in an air or N$_2$ atmosphere. When FePC is heat-treated under air condition, organic substances such as N or C in the vicinity of Fe are evaporated, and Fe is oxidized to produce Fe$_2$O$_3$. Therefore, after checking the weight of Fe$_2$O$_3$, the amount of FePC was derived by tracking back as described below.

FIG. 7 is a graph of thermogravimetric analysis (TGA) for the positive electrode catalyst (FePC16-CNT) prepared in Preparation Example 6.

Table 2 below shows elemental analysis (EA) and inductively coupled plasma (ICP) data for the positive electrode catalyst (FePC16-CNT) prepared in Preparation Example 6.

TABLE 2

| | EA | | | ICP |
|---|---|---|---|---|
| | C | N | O | Fe |
| Preparation Example 6 (FePC16-CNT) | 93.4 | 2.7 | 1.9 | 1.6 |

Referring to FIG. 7 and Table 2, the content of FePc in the positive electrode catalyst of Preparation Example 6 was consistent with the target loading of 16 wt. %. as determined from TGA results (2.3 wt. % ($Fe_2O_3$)=~FePC 16 wt. %) and ICP results (1.6 wt. % (Fe)=~FePC 16 wt. %).

Experimental Example 1: Experiment of Initial Discharging Capacity and Lifetime Characteristics of Lithium-Sulfur Secondary Battery Experiments on initial discharging capacity and lifetime characteristics of the lithium-sulfur secondary batteries prepared in Examples 1 to 6 and Comparative Examples 1 and 2, respectively were conducted.

Experimental results were measured for each lithium-sulfur secondary battery at a condition of 2.5 cycles at 0.1C (0.55 mA·$cm^{-2}$) charging/0.1C (0.55 mA·$cm^{-2}$) discharging, cycles at 0.2C (1.1 mA·$cm^{-2}$) charging/0.2C (1.1 mA·$cm^{-2}$) discharging, and thereafter 0.3C (1.65 mA·$cm^{-2}$) charging/0.5C (2.65 mA·$cm^{-2}$) discharging.

FIGS. 8a and 8b are graphs showing initial discharging capacity (FIG. 8a) and coulombic efficiency (FIG. 8b) of lithium-sulfur secondary batteries prepared in Example 1 and Comparative Example 1, respectively.

Referring to FIGS. 8a and 8b, Example 1 (S/FePC4-CNT) was found to have a significantly improved initial discharging capacity and improved overvoltage compared to Comparative Example 1 (ref).

FIGS. 9a and 9b are graphs showing initial discharging capacity (FIG. 9a) and coulombic efficiency (FIG. 9b) of lithium-sulfur secondary batteries prepared in Example 2 and Comparative Example 1, respectively.

Referring to FIGS. 9a and 9b, Example 2 (S/NiPC4-CNT) was found to have an increased initial discharging capacity, improved overvoltage, increased high-rate capacity, and improved lifetime characteristics compared to Comparative Example 1 (ref).

FIGS. 10a and 10b are graphs showing initial discharging capacity (FIG. 10a) and coulombic efficiency (FIG. 10b) of lithium-sulfur secondary batteries prepared in Example 3 and Comparative Example 1, respectively.

Referring to FIGS. 10a and 10b, Example 3 (S/MnPC4-CNT) was found to have an increased initial discharging capacity, improved overvoltage, and significantly increased high-rate capacity compared to Comparative Example 1 (ref).

FIGS. 11a and 11b are graphs showing initial discharging capacity (FIG. 11a) and coulombic efficiency (FIG. 11b) of lithium-sulfur secondary batteries prepared in Example 4 and Comparative Example 1, respectively.

Referring to FIGS. 11a and 11b, Example 4 (S/CuPC4-CNT) was found to have an increased initial discharging capacity and increased high-rate capacity compared to Comparative Example 1 (ref).

FIGS. 12a and 12b are graphs showing initial discharging capacity (FIG. 12a) and coulombic efficiency (FIG. 12b) of lithium-sulfur secondary batteries prepared in Example 5 and Comparative Example 1, respectively.

Referring to FIGS. 12a and 12b, Example 5 (S/ZnPC4-CNT) was found to have an increased initial discharging capacity compared to Comparative Example 1 (ref).

FIGS. 13a and 13b are graphs showing initial discharging capacity (FIG. 13a) and coulombic efficiency (FIG. 13b) of lithium-sulfur secondary batteries prepared in Comparative Example 2 and Comparative Example 1, respectively.

Referring to FIGS. 13a and 13b, Comparative Example 2 (S/CoPC4-CNT) was found to show no improvement over Comparative Example 1 (ref).

Table 3 summarizes the results of the above experiments for Examples 1 to 6 and Comparative Examples 1 to 3. The overvoltage is an evaluation of degree of relative superiority, inferiority, and equivalence, based on Comparative Example 1.

TABLE 3

|  | Initial discharging mAh/g (active) | Low-rate discharging @0.2 C | High-rate discharging @0.5 C | Discharging capacity @100 cycle | Overvoltage |
| --- | --- | --- | --- | --- | --- |
| Example 1 | 792 | 670 | 557 | 424 | Superiority |
| Example 2 | 770 | 692 | 581 | 496 | Superiority |
| Example 3 | 783 | 720 | 600 | 414 | Superiority |
| Example 4 | 774 | 685 | 577 | 460 | Inferiority |
| Example 5 | 788 | 690 | 578 | 382 | Equivalence |
| Example 6 | 800 | 670 | 555 | 343 | Superiority |
| Comparative Example 1 | 745 | 659 | 533 | 490 | — |
| Comparative Example 2 | 755 | 644 | 546 | 203 | Inferiority |
| Comparative Example 3 | 760 | 665 | 510 | 278 | Superiority |

Referring to Table 2, it can be seen that Example 1 is significantly superior in initial discharging capacity, Example 2 is superior in all parts, and Example 3 is highly superior in high-rate discharging capacity.

DESCRIPTION OF SYMBOLS

1: Positive electrode catalyst
2: Positive electrode active material
10: Porous carbon
11: Pore
20: Transition metal composite
30: Sulfur-containing material

The invention claimed is:
1. A lithium secondary battery comprising:
a positive electrode comprising a sulfur-containing material;
a negative electrode;
a separator interposed between the positive electrode and the negative electrode; and
an electrolyte solution, wherein the positive electrode further comprises a current collector and a positive electrode active material layer on the current collector, wherein the positive electrode active material layer comprises a positive electrode active material, and a positive electrode catalyst is contained in the positive electrode active material layer, wherein the positive electrode catalyst comprises a transition metal composite bonded to a surface of a porous carbon, wherein the transition metal composite comprises four nitrogen atoms bonded to the transition metal, and wherein the positive electrode catalyst is present in an amount of 20% by weight to 30% by weight based on a total weight of the positive electrode active material.

2. The lithium secondary battery according to claim 1, wherein the transition metal is at least one selected from the group consisting of Fe, Ni, Mn, Cu, and Zn.

3. A lithium secondary battery comprising:
a positive electrode comprising a sulfur-containing material;
a negative electrode;
a separator interposed between the positive electrode and the negative electrode; and
an electrolyte solution,
wherein the positive electrode further comprises a positive electrode catalyst comprising a transition metal composite bonded to a surface of a porous carbon, wherein the transition metal composite comprises four nitrogen atoms bonded to the transition metal, and wherein the transition metal composite is present in an amount of 1% by weight to 20% by weight based on a total weight of the positive electrode catalyst.

4. The lithium secondary battery according to claim 1, wherein the transition metal composite is bonded to at least one position of the surface of the porous carbon and an inner surface of pores of the porous carbon.

5. The lithium secondary battery according to claim 1, wherein the transition metal composite is adsorbed and bonded to the surface of the porous carbon by π-π interaction.

6. The lithium secondary battery according to claim 1, wherein the porous carbon comprises at least one selected from the group consisting of activated carbon, carbon nanotube (CNT), graphene, carbon black, acetylene black, graphite, graphite nanofiber (GNF) and fullerene.

7. The lithium secondary battery according to claim 1, wherein a pore size of the porous carbon is 2 nm to 50 nm.

8. The lithium secondary battery according to claim 1, wherein the lithium secondary battery is a lithium-sulfur secondary battery.

9. A positive electrode catalyst comprising:
a transition metal composite bonded to a surface of a porous carbon,
wherein the transition metal composite comprises four nitrogen atoms bonded to the transition metal, and
wherein the transition metal composite is present in an amount of 1% by weight to 20% by weight based on a total weight of the positive electrode catalyst.

10. The positive electrode catalyst according to claim 9, wherein the transition metal is at least one selected from the group consisting of Fe, Ni, Mn, Cu, and Zn.

11. The positive electrode catalyst according to claim 9, wherein the transition metal composite is bonded to at least one position of the surface of the porous carbon and an inner surface of pores of the porous carbon.

12. The positive electrode catalyst according to claim 9, wherein the transition metal composite is adsorbed and bonded to the surface of the porous carbon by 7C-7C interaction.

13. The positive electrode catalyst according to claim 9, wherein the porous carbon comprises at least one selected from the group consisting of activated carbon, carbon nanotube (CNT), graphene, carbon black, acetylene black, graphite, graphite nanofiber (GNF) and fullerene.

14. The positive electrode catalyst according to claim 9, wherein a pore size of the porous carbon is 2 nm to 50 nm.

15. The positive electrode catalyst according to claim 9, wherein the positive electrode catalyst is suitable for a lithium secondary electrode.

* * * * *